(12) United States Patent
Cai et al.

(10) Patent No.: US 12,057,563 B2
(45) Date of Patent: Aug. 6, 2024

(54) ELECTRODE SHEET, CELL AND BATTERY (71) Applicant: NINGDE AMPEREX TECHNOLOGY LIMITED, Ningde (CN)

(72) Inventors: Zhenghuang Cai, Ningde (CN); Hai Long, Ningde (CN); Qiang Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 178 days.

(21) Appl. No.: 16/828,742

(22) Filed: Mar. 24, 2020

(65) Prior Publication Data
US 2020/0313148 A1 Oct. 1, 2020

(30) Foreign Application Priority Data
Mar. 26, 2019 (CN) .......................... 201910234658.1

(51) Int. Cl.
*H01M 4/04* (2006.01)
*H01M 4/66* (2006.01)
(Continued)

(52) U.S. Cl.
CPC ........... *H01M 4/0404* (2013.01); *H01M 4/66* (2013.01); *H01M 4/70* (2013.01);
(Continued)

(58) Field of Classification Search
CPC ........ H01M 4/70; H01M 4/13; H01M 4/0404; H01M 10/0431; H01M 10/0587; H01M 50/531
See application file for complete search history.

(56) References Cited

U.S. PATENT DOCUMENTS 9,281,517 B2    3/2016  Matsushita et al.
10,411,243 B2 *  9/2019  Tsuji ................... H01M 50/133
(Continued)

FOREIGN PATENT DOCUMENTS

CN      105576191 A    5/2016
CN      205828567 U    12/2016
(Continued)

OTHER PUBLICATIONS

Machine Translation of Guo (Year: 2016).*
(Continued)

*Primary Examiner* — Matthew T Martin
*Assistant Examiner* — Ankith R Sripathi
(74) *Attorney, Agent, or Firm* — Morgan, Lewis & Bockius LLP (57) ABSTRACT

An electrode sheet has a first end and a second end opposite each other, and includes a current collector, active materials disposed on a first coated zone and a second coated zone, and a plurality of electrode tabs. The current collector includes a side edge, opposing first and second surfaces. The first surface includes a first coated zone and a first uncoated zone, and the second surface includes a second coated zone. At the first end, the first coated zone and the second coated zone are flush. At the second end, the first coated zone is misaligned with the second coated zone. The sum of the length of the first coated zone and the length of the first uncoated zone is equal to the length of the second coated zone. Each electrode tab is coupled to the current collector and protrudes beyond the side edge.

12 Claims, 9 Drawing Sheets

(51) Int. Cl.
  *H01M 4/70*     (2006.01)
  *H01M 10/04*    (2006.01)
  *H01M 50/46*    (2021.01)
  *H01M 50/533*   (2021.01)
  *H01M 50/538*   (2021.01)

(52) U.S. Cl.
  CPC ....... *H01M 10/0431* (2013.01); *H01M 50/46* (2021.01); *H01M 50/533* (2021.01); *H01M 50/538* (2021.01)

(56) References Cited

U.S. PATENT DOCUMENTS

| | | | |
|---|---|---|---|
| 10,879,518 B1* | 12/2020 | Holmdahl | H01M 10/0431 |
| 2008/0280197 A1 | 11/2008 | Machida | |
| 2014/0120417 A1* | 5/2014 | Matsushita | B60L 7/10 429/211 |
| 2014/0141303 A1 | 5/2014 | Matsushita et al. | |
| 2016/0141589 A1 | 5/2016 | Kang et al. | |
| 2017/0179461 A1* | 6/2017 | Moon | H01M 4/664 |

FOREIGN PATENT DOCUMENTS

| | | |
|---|---|---|
| CN | 205828573 U | 12/2016 |
| CN | 106848325 A | 6/2017 |
| CN | 206250284 U | 6/2017 |
| CN | 207320232 U | 5/2018 |
| EP | 3273510 A1 | 1/2018 |
| WO | WO2018/000189 A1 | 1/2018 |

OTHER PUBLICATIONS

Machine Translation of Zeng (Year: 2017).*
Machine Translation of Li (Year: 2017).*
Ningde Amperex Technology Limited, Extended European Search Report, EP20165071.0, Sep. 1, 2020, 9 pgs.
Ningde Amperex Technology Limited, Examination Report, IN202024013125, Jul. 29, 2021, 5 pgs.
Ningde New Energy Science and Technology Co. Ltd., Notice of the First Examination Opinion for CN201910234658.1, Apr. 7, 2020, 18 pgs.

* cited by examiner

ELECTRODE SHEET, CELL AND BATTERY

CROSS-REFERENCE TO RELATED APPLICATION

This application claims priority to and benefits of Chinese Patent Application Serial No. 201910234658.1, filed with National Intellectual Property Administration of PRC on Mar. 26, 2019, the entire content of which is incorporated herein by reference.

TECHNICAL FIELD

The present disclosure relates to a technical field of batteries, and more particularly, to an electrode sheet, a cell, and a battery.

BACKGROUND

With the development of electronic products and the continuous improvement of battery-related technologies, requirements for battery performance become higher and higher. The battery performance directly determines the endurance of electronic products. Major parameters affecting the battery performance are energy density and charge and discharge efficiency of batteries. Electrode sheets and electrode tabs are important structural components of batteries, internal resistance of the electrode tabs affects the charge and discharge efficiency of the batteries, and configuration of active material layers on the electrode sheets affects the energy density of the batteries. Therefore, improvement on structures of the electrode sheets and the electrode tabs is a significant way to upgrade the battery performance.

SUMMARY

The present disclosure aims to solve at least one of the technical problems existing in the related art. Accordingly, the present disclosure proposes an electrode sheet that has advantages of a simple structure and stable performance.

The present disclosure further proposes a cell having the above electrode sheet.

The present disclosure further proposes a battery having the above cell.

The electrode sheet according to embodiments of the present disclosure has a first end and a second end opposite each other. The electrode sheet includes: a current collector including a side edge, the current collector including a first surface and a second surface opposite each other, the first surface including a first coated zone and a first uncoated zone, and the second surface including a second coated zone, the first coated zone being flush with the second coated zone at the first end, the first coated zone being misaligned with the second coated zone at the second end, and the sum of a length of the first coated zone and a length of the first uncoated zone being equal to a length of the second coated zone; an active material disposed on the first coated zone and the second coated zone; and a plurality of electrode tabs, each electrode tab being coupled to the current collector and protruding beyond the side edge.

For the electrode sheet according to embodiments of the present disclosure, by providing the plurality of electrode tabs that are connected in parallel with each other, the internal resistance of the electrode sheet can be reduced, and the discharge performance of the electrode sheet can be improved. The electric energy of the current collector can be transmitted through any one of the electrode tabs, so that the electrode sheet failure caused by the damage of a single electrode tab in the related art can be avoided, and after the current collector is locally broken, the electric energy at other positions of the current collector can still be transmitted through the electrode tabs, thereby reducing the probability of failure of the electrode sheet, so as to enhance the performance of the electrode sheet. Moreover, since the first coated zone and the second coated zone are flush at one end and misaligned at the other end, a single-sided coated zone can be formed at one end of the electrode sheet, thereby improving the energy density and the production efficiency of the electrode sheet within the cost budget.

According to some embodiments of the present disclosure, the first uncoated zone is provided with the electrode tabs.

According to some embodiments of the present disclosure, at least one of the first end and the second end further includes a current collector having no active material disposed on both sides.

The cell according to embodiments of the present disclosure includes a separator, a cathode electrode sheet, and an anode electrode sheet. The cathode electrode sheet and the anode electrode sheet are electrodes as described above.

For the cell according to embodiments of the present disclosure, by employing the cathode electrode sheet and the anode electrode sheet of the above-described electrode sheet configuration, the internal resistance of the cathode electrode sheet and the anode electrode sheet can be reduced, the energy density of the cell can be improved, the high rate discharge of the cell can be realized, and the failure probability of the cell can be decreased.

According to some embodiments of the present disclosure, the first coated zone is misaligned with the second coated zone at a tail end of the cathode electrode sheet; the first coated zone is misaligned with the second coated zone at a head end of the anode electrode sheet.

In some embodiments of the present disclosure, a head end and a tail end of the cathode electrode sheet include a current collector having no cathode active material disposed on both sides.

In some embodiments of the present disclosure, a head end and a tail end of the anode electrode sheet include a current collector having no anode active material disposed on both sides.

In some embodiments of the present disclosure, a tail end of the cathode electrode sheet includes a current collector having no cathode active material disposed on both sides; a head end and a tail end of the anode electrode sheet include a current collector having no anode active material disposed on both sides.

According to some embodiments of the present disclosure, the anode electrode sheet includes a plurality of anode electrode tabs and the side edge, the anode electrode tabs protrude beyond the side edge, and the side edge is provided with an insulating member.

The battery according to embodiments of the present disclosure includes a cell, an electrolyte, and a packaging case, in which the cell is a cell as described above.

For the battery according to embodiments of the present disclosure, by using the above cell, the energy density of the battery can be increased, the high rate discharge of the battery can be realized, and the endurance of the battery can be improved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference the accompanying drawings, in which.

REFERENCE NUMERALS cell 1,
anode electrode sheet 11, cathode electrode sheet 12, first end 13, second end 14,
current collector 100, side edge 110, first surface 120, first coated zone 121, first uncoated zone 122, second surface 130, second coated zone 131, blank foil segment 140,
active material 200,
electrode tab 300,
separator 20.

DETAILED DESCRIPTION

Embodiments of the present disclosure will be described in detail below, and examples of the embodiments will be illustrated in the accompanying drawings, the same or similar elements and the elements having same or similar functions are denoted by like reference numerals throughout the descriptions. The embodiments described with reference to the drawings are exemplary and only used to understand the present disclosure, and shall not be construed to limit the present disclosure.

Various embodiments and examples are provided in the following description to implement different structures of the present disclosure. In order to simplify the present disclosure, certain elements and settings will be described below. However, these elements and settings are only by way of example and are not intended to limit the present disclosure. In addition, reference numerals and/or letters may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Figure 1:
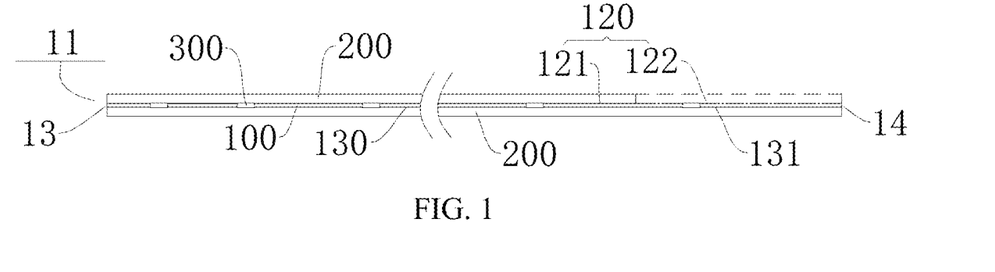
FIG. 1 is a structural schematic diagram of an electrode sheet according to embodiments of the present disclosure.

As shown in FIG. 1, an anode electrode sheet 11 according to embodiments of the present disclosure has a first end 13 and a second end 14 opposite each other. For example, the anode electrode sheet 11 may be formed in an elongated shape, and the first end 13 and the second end 14 may be two ends in a length direction of the anode electrode sheet 11. The anode electrode sheet 11 includes a current collector 100, an active material 200, and a plurality of electrode tabs 300. The term "a plurality of" herein means two or more than two.

Figure 2:
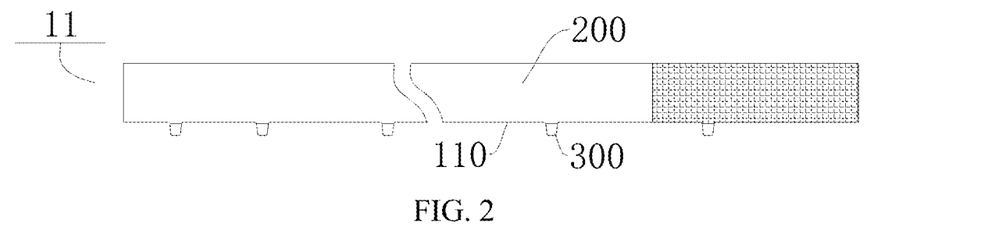
FIG. 2 is a structural schematic diagram of an electrode sheet according to embodiments of the present disclosure.

Specifically, as shown in FIGS. 1 and 2, the anode electrode sheet 11 includes a side edge 110, and the current collector 100 includes a first surface 120 and a second surface 130 opposite each other. For example, the side edge 110, the first surface 120, and the second surface 130 all extend along an extension direction of the anode electrode sheet 11, the first surface 120 and the second surface 130 may be two surfaces in a thickness direction of the current collector 100, and the side edge 110 may be located between the first surface 120 and the second surface 130.

As shown in FIG. 1, the first surface 120 includes a first coated zone 121 and a first uncoated zone 122, and the second surface 130 includes a second coated zone 131. The active material 200 is disposed in the first coated zone 121 and the second coated zone 131. It could be understood that the first coated zone 121 can be an area of the first surface 120 coated with the active material 200; the first uncoated zone 122 has no active material 200; and the second coated zone 131 can be an area of the second surface 130 coated with the active material 200. The sum of a length of the first coated zone 121 and a length of the first uncoated zone 122 is equal to a length of the second coated zone 131.

As shown in FIG. 1, at the first end 13, the first coated zone 121 is flush with the second coated zone 131; at the second end 14, the first coated zone 121 and the second coated zone 131 are misaligned. It could be understood that an end face of the first coated zone 121 close to the first end 13 is flush with an end face of the second coated zone 131 close to the first end 13, and an end face of the first coated zone 121 close to the second end 14 is misaligned with an end face of the second coated zone 131 close to the second end 14.

As shown in FIG. 1, each electrode tab 300 is coupled to the current collector 100, and each electrode tab 300 protrudes beyond the side edge 110. One end of each electrode tab 300 can extend out of the side edge 110. It should be noted that "coupled" as referred to herein could be understood as presence of signal transmission or energy transmission between the electrode tabs 300 and the current collector 100. For example, the transmission of electric energy exists between the electrode tabs 300 and the current collector 100.

In the related art, an electrode sheet is usually provided with one electrode tab, and when the electrode tab is damaged or the current collector is broken, the electrode sheet will fail. In addition, the coating method of the active material on the electrode sheet usually includes a misalignment-free manner, that is, active layers on both sides of the current collector are flush at one end and also flush at the other end; the electrode sheet without misalignment is formed into a cathode electrode sheet and an anode electrode sheet, and after the cathode electrode sheet and the anode electrode sheet are wound, the pairing energy cannot be fully exerted, resulting in a low energy density of the cell. However, electrode sheets with both ends misaligned have a difficult process and a high cost.

For the anode electrode sheet 11 according to embodiments of the present disclosure, by providing the plurality of electrode tabs 300 that are connected in parallel with each other, the internal resistance of the anode electrode sheet 11 can be reduced, and the discharge performance of the anode electrode sheet 11 can be improved. The electric energy of the current collector 100 can be transmitted through any one of the electrode tabs 300, so that the electrode sheet failure caused by the damage of single electrode tab in the related art can be avoided, and after the current collector 100 is locally broken, the electric energy at other positions of the current collector 100 can still be transmitted through the electrode tabs 300, thereby reducing the probability of failure of the anode electrode sheet 11, so as to enhance the performance of the anode electrode sheet 11. Moreover, since the first coated zone 121 and the second coated zone 131 are flush at one end and are misaligned at the other end, a single-sided coated zone can be formed at one end of the anode electrode sheet 11, thereby improving the energy density and the charge and discharge performance of the battery simultaneously.

As shown in FIG. 1, according to some embodiments of the present disclosure, the first uncoated zone 122 is provided with the electrode tab 300. It could be understood that at least one of the plurality of electrode tabs 300 is located at the first uncoated zone 122. For example, the anode electrode sheet 11 has five electrode tabs 300 with four electrode tabs 300 located at the first coated zone 121 and one electrode tab 300 located at the first uncoated zone 122. In the process of winding the anode electrode sheet 11 into a cell 1, the anode electrode sheet 11 located in an wound inner ring has a small winding radius and is easy to break, especially at the first uncoated zone 122, so if only one electrode tab is provided at the head of the anode electrode sheet 11, this will result in open circuit of the anode electrode sheet 11. By providing the plurality of electrode tabs 300 at the first uncoated zone 122, the energy of the anode electrode sheet 11 at the breakage can be conducted through the side-edge electrode tabs 300, thereby ensuring the usability of the anode electrode sheet 11.

As shown in FIG. 1, according to some embodiments of the present disclosure, the second surface 130 can be completely covered by the active material 200, that is, the second surface 130 is configured to form the second coated zone 131, and the first surface 120 is composed of the first coated zone 121 and the first uncoated zone 122.

Figure 13:
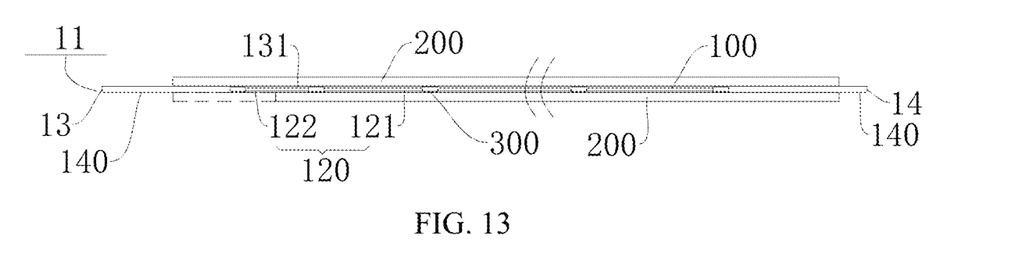
FIG. 13 is a structural schematic diagram of an electrode sheet according to embodiments of the present disclosure.

As shown in FIG. 13, according to some embodiments of the present disclosure, at least one of the first end 13 and the second end 14 further includes a current collector 100 having no active material 200 disposed on both sides. For convenience of description, the current collector 100 having no active material 200 disposed on both the first surface 120 and the second surface 130 is defined as a blank foil segment 140.

Figure 26:
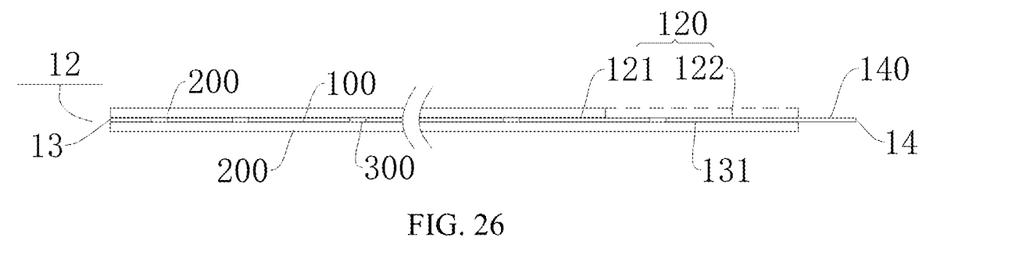
FIG. 26 is a structural schematic diagram of an electrode sheet according to embodiments of the present disclosure.

As shown in FIG. 26, in some embodiments of the present disclosure, the first end 13 or the second end 14 of the current collector 100 is provided with the blank foil segment 140. For example, as shown in FIG. 26, in a direction from the first end 13 to the second end 14, the first surface 120 of the current collector 100 can include the first coated zone 121 and the first uncoated zone 122, while the second surface 130 of the current collector 100 can include the second coated zone 131. An end face of the first coated zone 121 close to the first end 13 is flush with an end face of the second coated zone 131 close to the first end 13, and an end face of the first uncoated zone 122 close to the second end 14 is flush with an end face of the second coated zone 131 close to the second end 14.

As shown in FIG. 13, in some embodiments of the present disclosure, the first end 13 and the second end 14 of the current collector 100 both include the blank foil segment 140. For example, in the direction from the first end 13 to the second end 14, the first surface 120 of the current collector 100 can include the first uncoated zone 122 and the first coated zone 121, while the second surface 130 of the current collector 100 can include the second coated zone 131. The end face of the first coated zone 121 close to the second end 14 is flush with the end face of the second coated zone 131 close to the second end 14, and the end face of the first uncoated zone 122 close to the first end 13 is flush with the end face of the second coated zone 131 close to the first end 13.

Therefore, after the electrode sheet is configured to form the cathode electrode sheet and the anode electrode sheet, the blank foil segment 140 of the cathode electrode sheet and the blank foil segment 140 of the anode electrode sheet can be opposed to improve the safety performance of the cell 1. It could be understood that, a failure mode of short circuit between the blank foil segment of the cathode electrode sheet and the blank foil segment of the anode electrode sheet is safer than other failure modes, such as short circuit between the active material of the cathode electrode sheet and the active material of the anode electrode sheet, or short circuit between the blank foil segment of one of the cathode electrode sheet and the anode electrode sheet and the active material of the other of the cathode electrode sheet and the anode electrode sheet.

Figure 5:
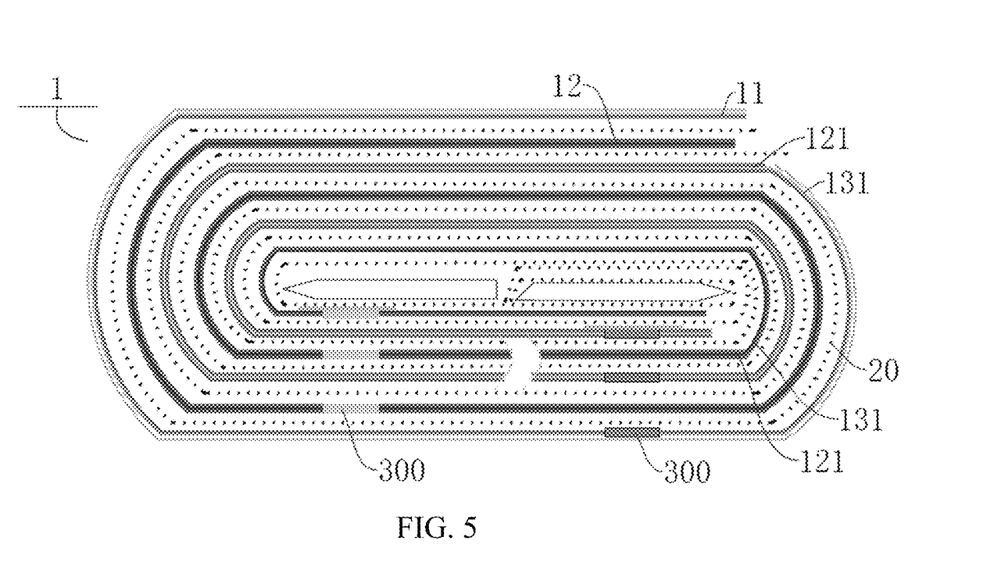
FIG. 5 is a structural schematic diagram of a cell according to embodiments of the present disclosure.

As shown in FIG. 5, the cell 1 according to embodiments of the present disclosure includes a separator 20, a cathode electrode sheet 12, and an anode electrode sheet 11. The current collectors 100 of the anode electrode sheet 11 and the cathode electrode sheet 12 have different materials. The separator 20 can be disposed between the anode electrode sheet 11 and the cathode electrode sheet 12 to separate the cathode electrode sheet 12 from the anode electrode sheet 11.

Figure 3:
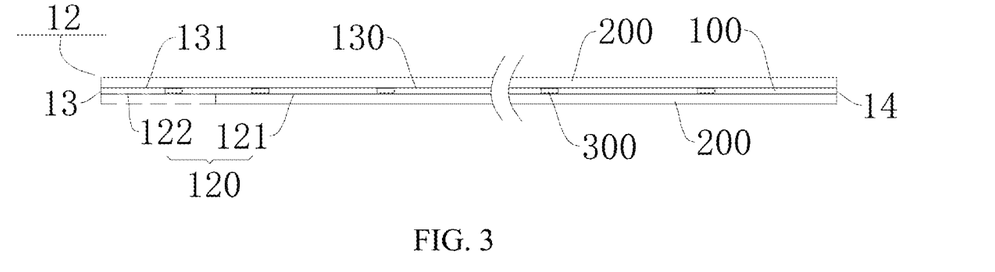
FIG. 3 is a structural schematic diagram of an electrode sheet according to embodiments of the present disclosure.
Figure 4:
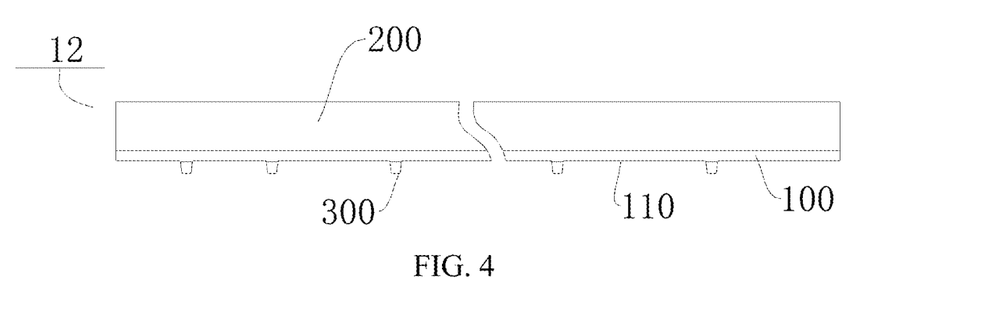
FIG. 4 is a structural schematic diagram of an electrode sheet according to embodiments of the present disclosure.

For example, the current collector 100 of FIG. 1 is a copper foil to form an anode electrode sheet 11, and FIG. 2 is a view at the first surface 120 of FIG. 1; the current collector 100 of FIG. 3 is an aluminum foil to form a cathode electrode sheet 12, and FIG. 4 is a view at the second surface 130 of FIG. 3; the cathode electrode sheet 12 and the anode electrode sheet 11 are laminated and wound to form a cell 1 of an embodiment shown in FIG. 5.

Figure 6:
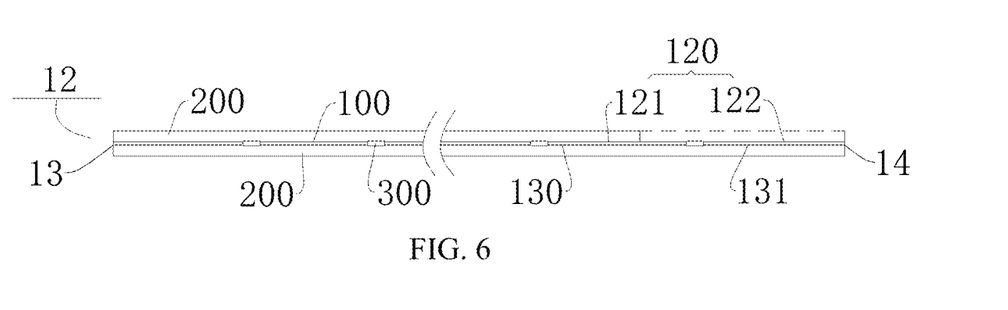
FIG. 6 is a structural schematic diagram of an electrode sheet according to embodiments of the present disclosure.
Figure 7:
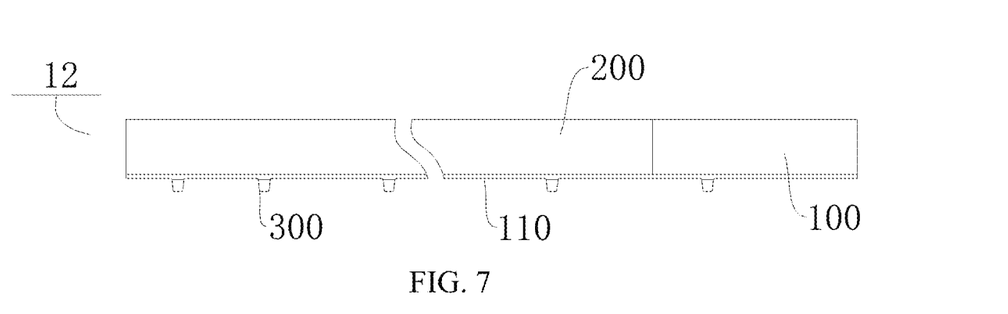
FIG. 7 is a structural schematic diagram of an electrode sheet according to embodiments of the present disclosure.
Figure 8:
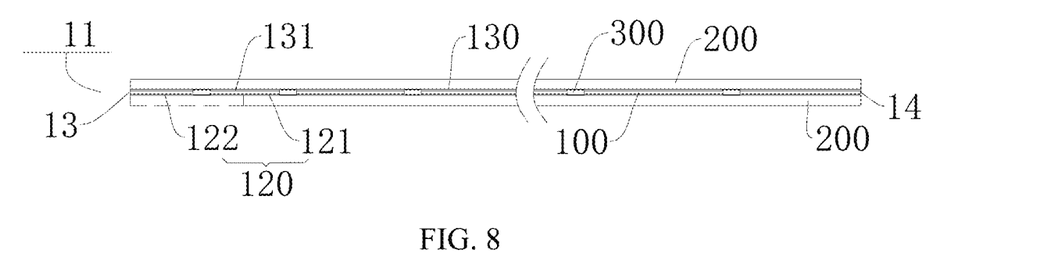
FIG. 8 is a structural schematic diagram of an electrode sheet according to embodiments of the present disclosure.
Figure 9:
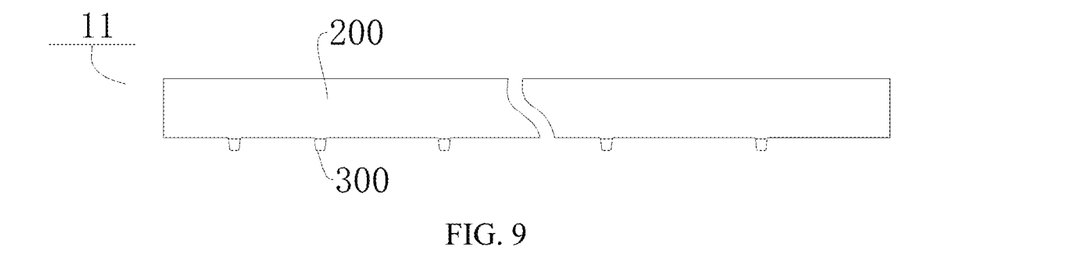
FIG. 9 is a structural schematic diagram of an electrode sheet according to embodiments of the present disclosure.
Figure 10:
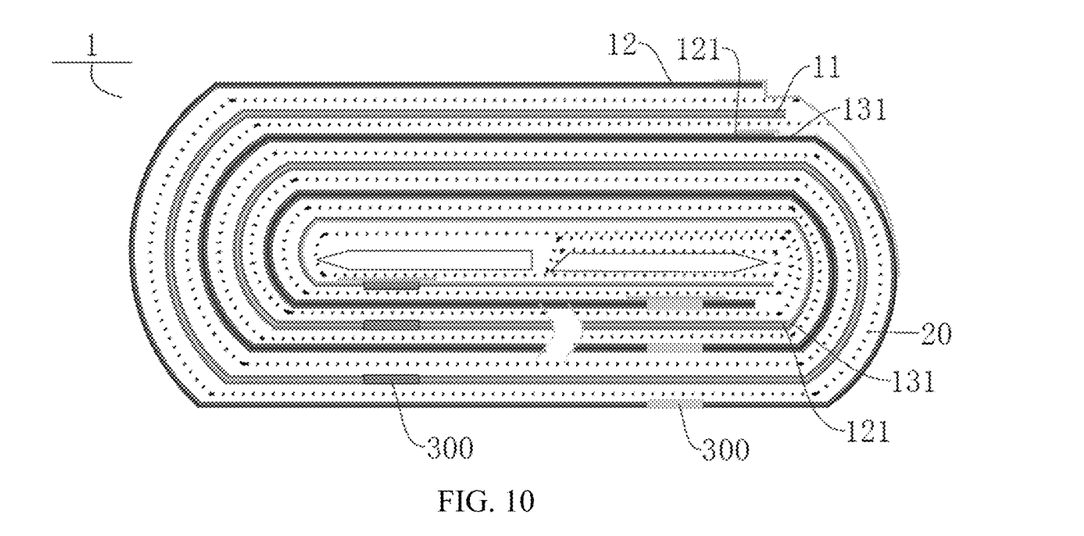
FIG. 10 is a structural schematic diagram of a cell according to embodiments of the present disclosure.

For example, the current collector 100 of FIG. 6 is an aluminum foil to form a cathode electrode sheet 12, and FIG. 7 is a view at the first surface 120 of FIG. 6; the current collector 100 of FIG. 8 is a copper foil to form an anode electrode sheet 11, and FIG. 9 is a view at the second surface 130 of FIG. 8; the cathode electrode sheet 12 and the anode electrode sheet 11 are laminated and wound to form a cell 1 of an embodiment shown in FIG. 10.

Figure 11:
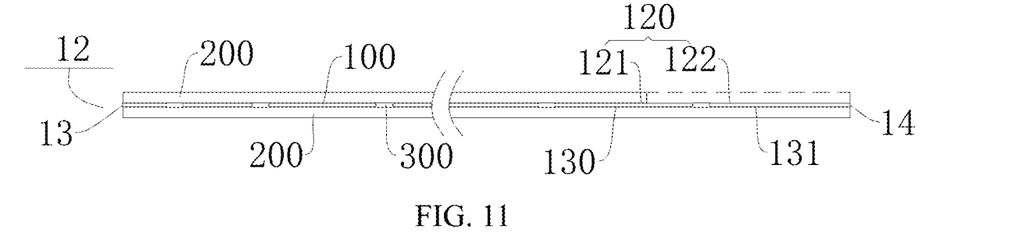
FIG. 11 is a structural schematic diagram of an electrode sheet according to embodiments of the present disclosure.
Figure 12:
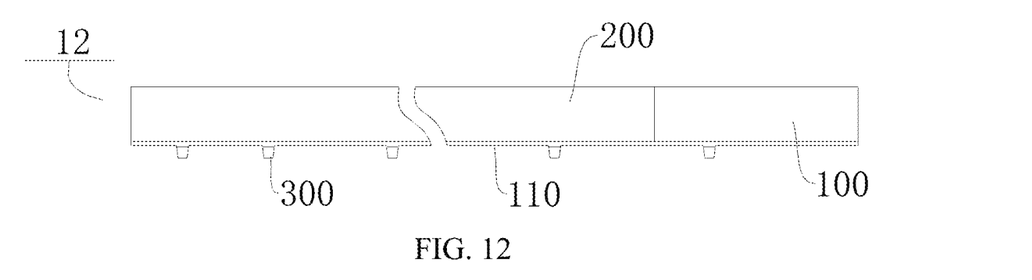
FIG. 12 is a structural schematic diagram of an electrode sheet according to embodiments of the present disclosure.
Figure 14:
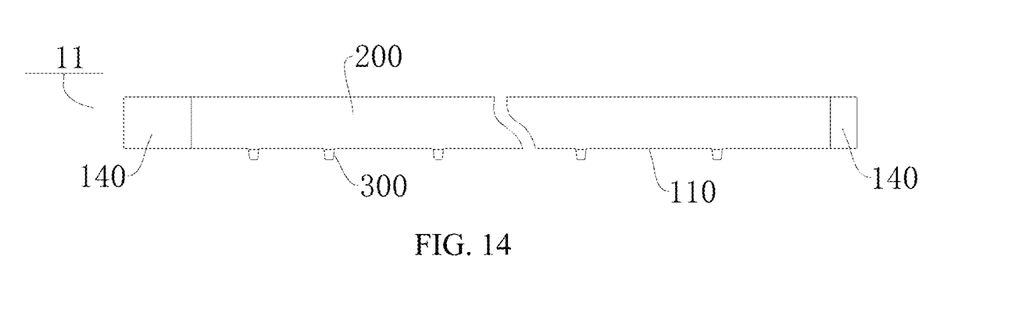
FIG. 14 is a structural schematic diagram of an electrode sheet according to embodiments of the present disclosure.
Figure 15:
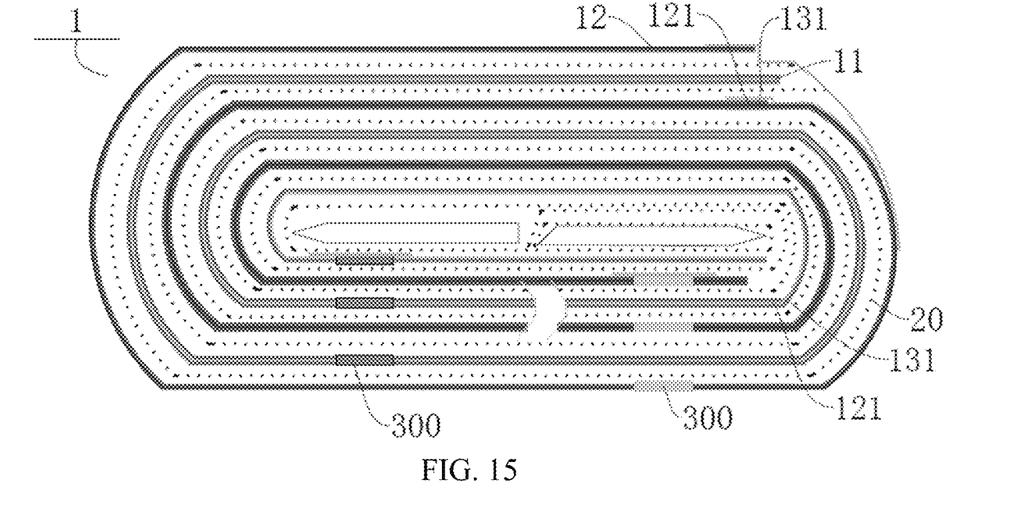
FIG. 15 is a structural schematic diagram of a cell according to embodiments of the present disclosure.

For example, the current collector 100 of FIG. 11 is an aluminum foil to form a cathode electrode sheet 12, and FIG. 12 is a view at the first surface 120 of FIG. 11; the current collector 100 of FIG. 13 is a copper foil to form an anode electrode sheet 11, and FIG. 14 is a view at the second surface 130 of FIG. 13; the cathode electrode sheet 12 and the anode electrode sheet 11 are laminated and wound to form a cell 1 of an embodiment shown in FIG. 15.

Figure 16:
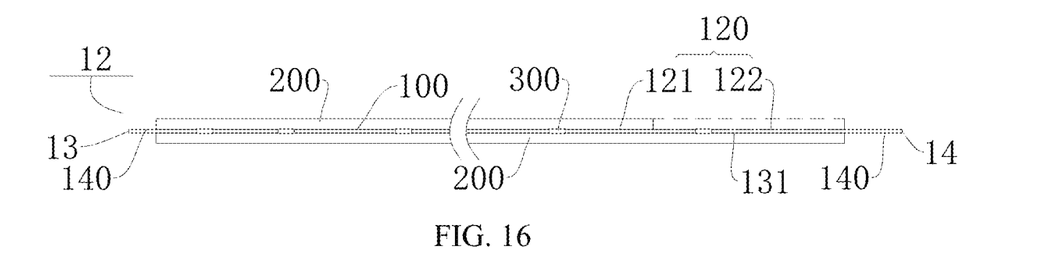
FIG. 16 is a structural schematic diagram of an electrode sheet according to embodiments of the present disclosure.
Figure 17:
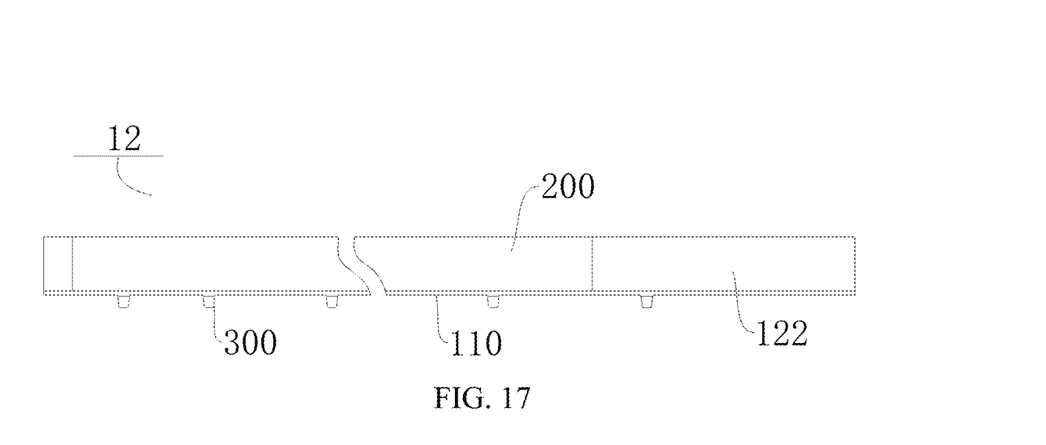
FIG. 17 is a structural schematic diagram of an electrode sheet according to embodiments of the present disclosure.
Figure 18:
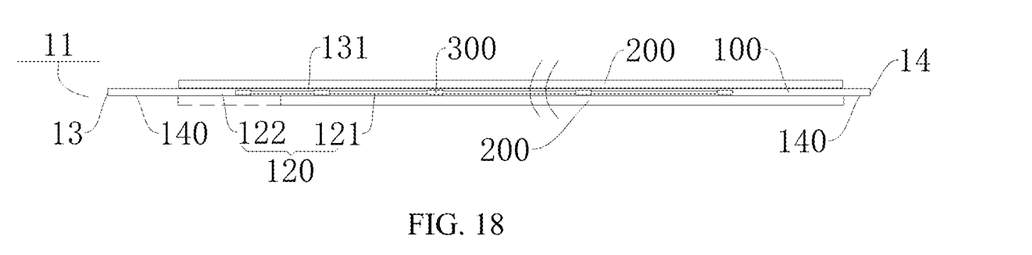
FIG. 18 is a structural schematic diagram of an electrode sheet according to embodiments of the present disclosure.
Figure 19:
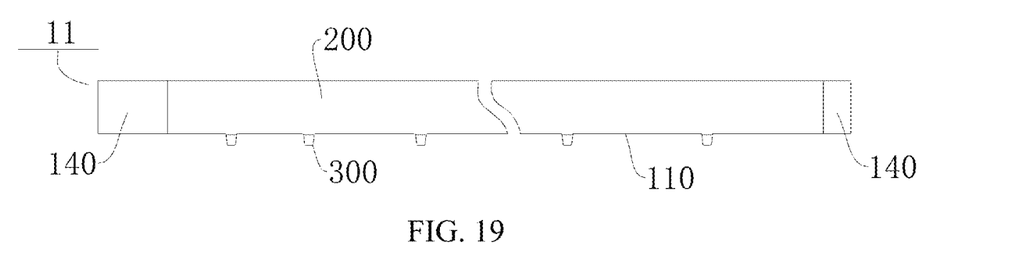
FIG. 19 is a structural schematic diagram of an electrode sheet according to embodiments of the present disclosure.
Figure 20:
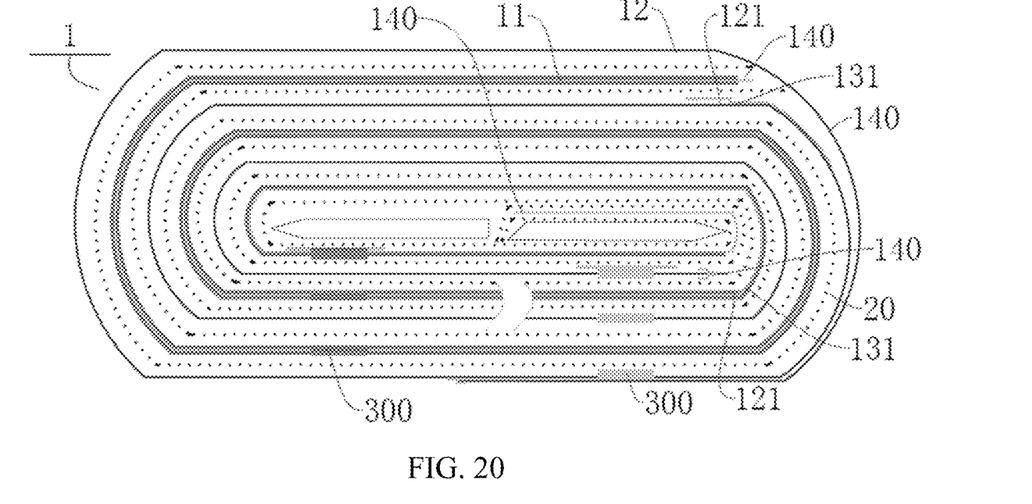
FIG. 20 is a structural schematic diagram of a cell according to embodiments of the present disclosure.

For example, the current collector 100 of FIG. 16 is an aluminum foil to form a cathode electrode sheet 12, and FIG. 17 is a view at the first surface 120 of FIG. 16; the current collector 100 of FIG. 18 is a copper foil to form an anode electrode sheet 11, and FIG. 19 is a view at the second surface 130 of FIG. 18; the cathode electrode sheet 12 and the anode electrode sheet 11 are laminated and wound to form a cell 1 of an embodiment shown in FIG. 20.

Figure 21:
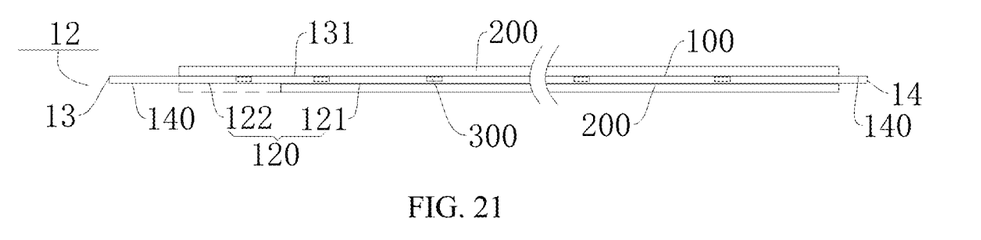
FIG. 21 is a structural schematic diagram of an electrode sheet according to embodiments of the present disclosure.
Figure 22:
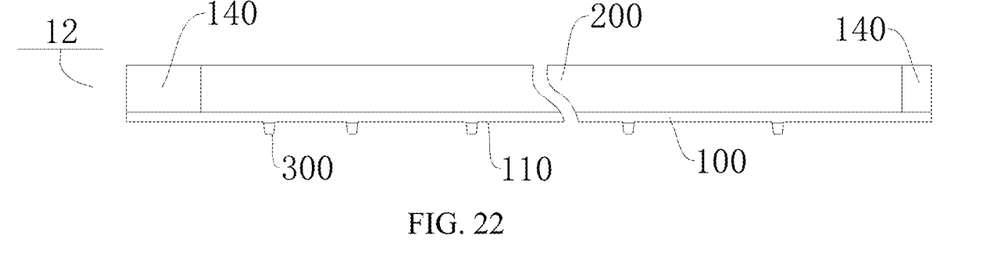
FIG. 22 is a structural schematic diagram of an electrode sheet according to embodiments of the present disclosure.
Figure 23:
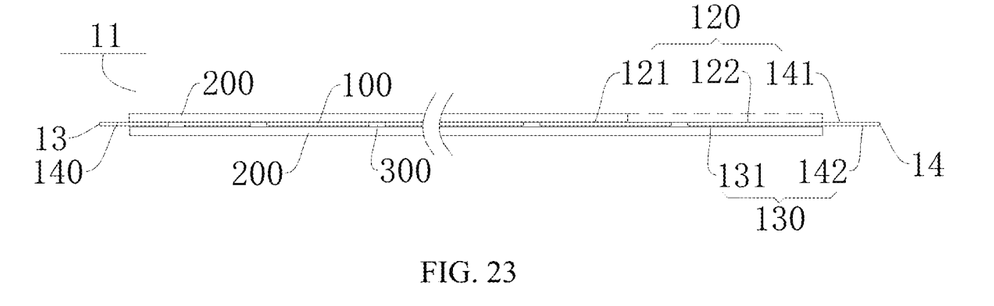
FIG. 23 is a structural schematic diagram of an electrode sheet according to embodiments of the present disclosure.
Figure 24:
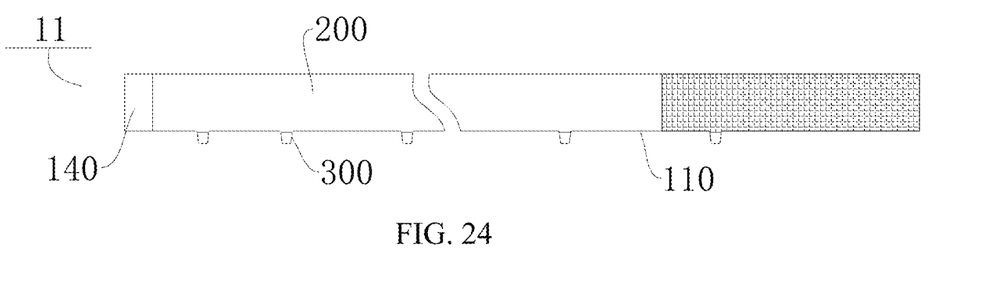
FIG. 24 is a structural schematic diagram of an electrode sheet according to embodiments of the present disclosure.
Figure 25:
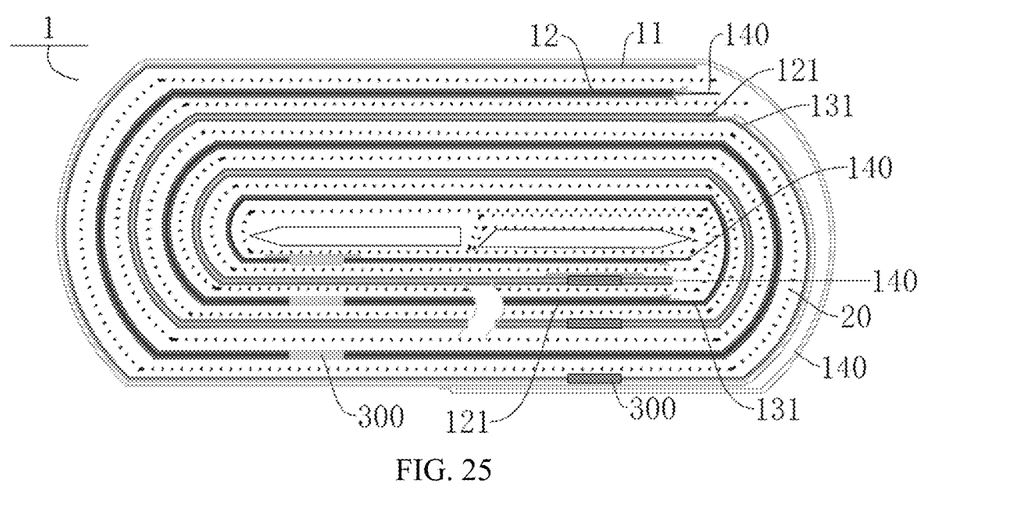
FIG. 25 is a structural schematic diagram of a cell according to embodiments of the present disclosure.

For example, the current collector 100 of FIG. 21 is an aluminum foil to form a cathode electrode sheet 12, and FIG. 22 is a view at the first surface 120 of FIG. 21; the current collector 100 of FIG. 23 is a copper foil to form an anode electrode sheet 11, and FIG. 24 is a view at the second surface 130 of FIG. 23; the cathode electrode sheet 12 and the anode electrode sheet 11 are laminated and wound to form a cell 1 of an embodiment shown in FIG. 25.

Figure 27:
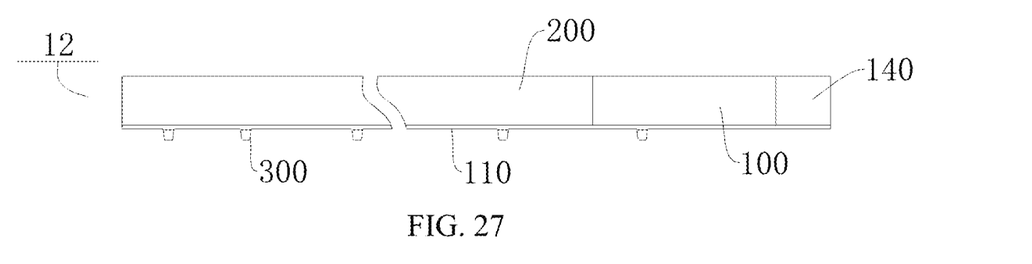
FIG. 27 is a structural schematic diagram of an electrode sheet according to embodiments of the present disclosure.
Figure 28:
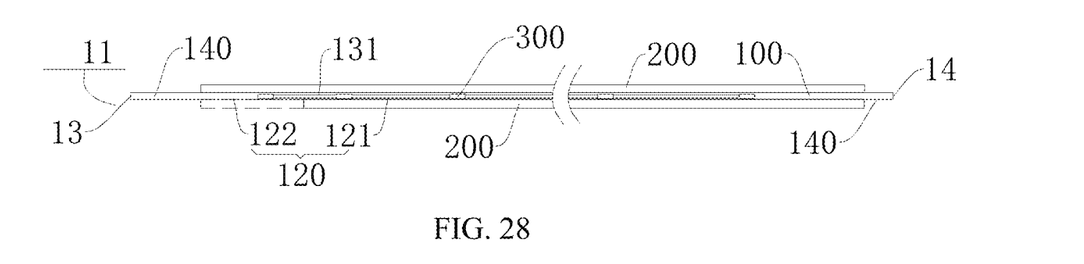
FIG. 28 is a structural schematic diagram of an electrode sheet according to embodiments of the present disclosure.
Figure 29:
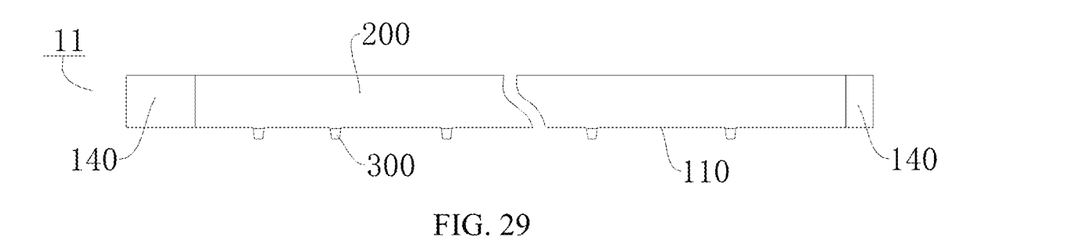
FIG. 29 is a structural schematic diagram of an electrode sheet according to embodiments of the present disclosure.
Figure 30:
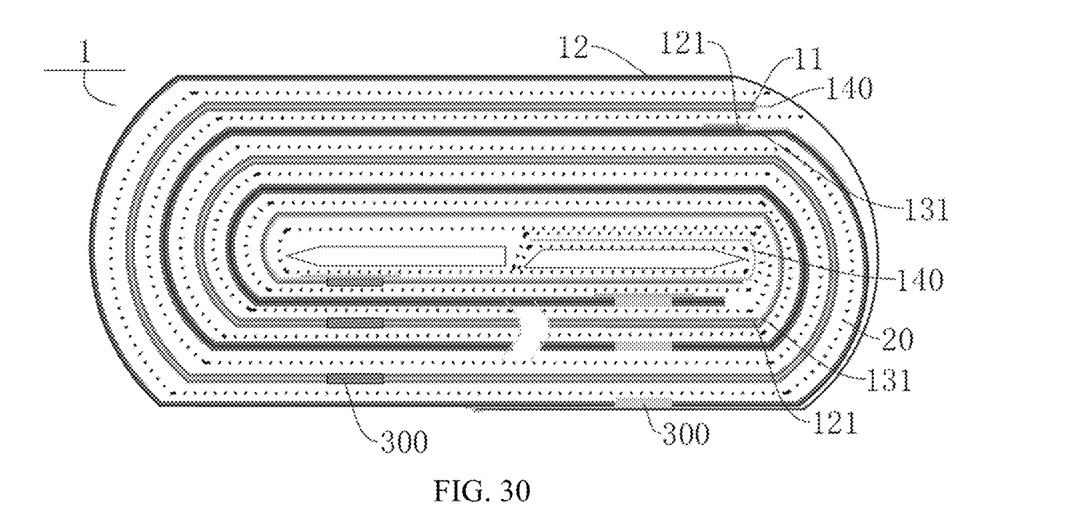
FIG. 30 is a structural schematic diagram of a cell according to embodiments of the present disclosure.

For example, the current collector 100 of FIG. 26 is an aluminum foil to form a cathode electrode sheet 12, and FIG. 27 is a view at the first surface 120 of FIG. 26; the current collector 100 of FIG. 28 is a copper foil to form an anode electrode sheet 11, and FIG. 29 is a view at the second surface 130 of FIG. 28; the cathode electrode sheet 12 and the anode electrode sheet 11 are laminated and wound to form a cell 1 of an embodiment shown in FIG. 30.

For the cell 1 according to the embodiments of the present disclosure, by using the cathode electrode sheet 12 and the anode electrode sheet 11 described above, the internal resistance can be reduced, the energy density of the cell 1 can be improved, the high rate discharge of the cell 1 can be realized, and the failure probability of the cell 1 can be decreased.

As shown in FIG. 10, according to some embodiments of the present disclosure, at a tail end of the cathode electrode sheet 12, the first coated zone 121 and the second coated zone 131 are misaligned; at a head end of the anode electrode sheet 11, the first coated zone 121 and the second coated zone 131 are misaligned. It should be noted that the "tail end" herein may be an end close to an outer side of the cell 1 after the cathode electrode sheet 12 and the anode electrode sheet 11 are wound to form the cell 1, and the "head end" may be an end close to an inner side of the cell 1.

It could be understood that, near a head end of the cathode electrode sheet 12, the first coated zone 121 and the second coated zone 131 are flush, and near the tail end of the cathode electrode sheet 12, the first coated zone 121 and the second coated zone 131 are misaligned; near the head end of the anode electrode sheet 11, the first coated zone 121 and the second coated zone 131 are misaligned, and near the tail end of the cathode electrode sheet 12, the first coated zone 121 and the second coated zone 131 are flush. Thus, the cathode electrode sheet 12 can realize energy pairing with the anode electrode sheet 11 at the head end and the tail end of the cathode electrode sheet 12, thereby improving the energy density of the cell 1.

As shown in FIGS. 5 and 25, according to some embodiments of the present disclosure, at the head end of the cathode electrode sheet 12, the first coated zone 121 and the second coated zone 131 are misaligned; at the tail end of the anode electrode sheet 11, the first coated zone 121 and the second coated zone 131 are misaligned. It could be understood that, near the head end of the cathode electrode sheet 12, the first coated zone 121 and the second coated zone 131 are misaligned, and near the tail end of the cathode electrode sheet 12, the first coated zone 121 and the second coated zone 131 are flush; near the head end of the anode electrode sheet 11, the first coated zone 121 and the second coated zone 131 are flush, and near the tail end of the cathode electrode sheet 12, the first coated zone 121 and the second coated zone 131 are misaligned. Thus, the cathode electrode sheet 12 can realize energy pairing with the anode electrode sheet 11 at the head end and the tail end of the cathode electrode sheet 12, thereby improving the energy density of the cell 1.

As shown in FIGS. 20 and 25, in some embodiments of the present disclosure, the head end and the tail end of the cathode electrode sheet 12 each include a current collector 100 having no cathode active material disposed on both sides. It should be noted that the "cathode active material" mentioned herein may be the active material 200 having a cathode polarity. It could be understood that the length of the second coated zone 131 on the cathode electrode sheet 12 is smaller than the length of the current collector 100 of the cathode electrode sheet 12. The second coated zone 131 of the cathode electrode sheet 12 is centrally disposed on the second surface 130 of the cathode electrode sheet 12, and both ends of the second coated zone 131 are misaligned with both ends of the current collector 100 of the cathode electrode sheet 12 correspondingly. Thus, both ends of the cathode electrode sheet 12 can form the blank foil segment 140, thereby improving the safety performance of the cell 1.

As shown in FIGS. 20, 25, and 30, in some embodiments of the present disclosure, the head end and the tail end of the anode electrode sheet 11 each include a current collector 100 having no anode active material disposed on both sides. It should be noted that the "anode active material" mentioned herein may be the active material 200 having an anode polarity. It could be understood that the length of the second coated zone 131 on the anode electrode sheet 11 is smaller than the length of the current collector 100 of the anode electrode sheet 11. The second coated zone 131 of the anode electrode sheet 11 is centrally disposed on the second surface 130 of the anode electrode sheet 11, and both ends of the second coated zone 131 are misaligned with both ends of the current collector 100 of the anode electrode sheet 11 correspondingly. Thus, both ends of the anode electrode sheet 11 can form the blank foil segment 140, thereby improving the safety performance of the cell 1.

As shown in FIG. 30, in some embodiments of the present disclosure, the tail end of the cathode electrode sheet 12 includes a current collector 100 having no cathode active material disposed on both sides, and the head end and the tail end of the anode electrode sheet 11 each include a current collector 100 having no anode active material disposed on both sides. It could be understood that the length of the second coated zone 131 on the cathode electrode sheet 12 is smaller than the length of the current collector 100 of the cathode electrode sheet 12. The end face of the second coated zone 131 close to the head end of the cathode electrode sheet 12 is flush with an end face of the head end of the cathode electrode sheet 12. The end face of the second coated zone 131 close to the tail end of the cathode electrode sheet 12 is misaligned with an end face of the tail end of the cathode electrode sheet 12. The length of the second coated zone 131 on the anode electrode sheet 11 is smaller than the length of the current collector 100 of the anode electrode sheet 11. The second coated zone 131 of the anode electrode sheet 11 is centrally disposed on the second surface 130 of the anode electrode sheet 11, and both ends of the second coated zone 131 are misaligned with both ends of the current collector 100 of the anode electrode sheet 11 correspondingly. Thus, both the anode electrode sheet 11 and the cathode electrode sheet 12 can have the blank foil segment 140, so as to improve the safety performance of the cell 1. It could be understood that, a failure mode of short circuit between the blank foil segment of the cathode electrode sheet and the blank foil segment of the anode electrode sheet is safer than other failure modes, such as short circuit between the active material of the cathode electrode sheet and the active material of the anode electrode sheet, or short circuit between the blank foil segment of one of the cathode electrode sheet and the anode electrode sheet and the active material of the other of the cathode electrode sheet and the anode electrode sheet.

According to some embodiments of the present disclosure, the anode electrode sheet 11 includes a plurality of anode electrode tabs and a side edge 110, the anode electrode tabs protrude beyond the side edge 110, and the side edge 110 is provided with an insulating member. It should be noted that the "anode electrode tab" mentioned herein may be an electrode tab 300 having an anode polarity. In addition, the term "a plurality of" means two or more than two.

A battery according to embodiments of the present disclosure includes a cell 1, an electrolyte, and a packaging case. The cell 1 is a cell 1 as described above. For example, the packaging case can wrap the cell 1, and the electrolyte is in the packaging case and can be filled around the cell 1.

The battery according to the embodiments of the present disclosure, by using the above-mentioned cell 1, can increase the energy density of the battery, realize the high rate discharge of the battery, and improve the endurance of the battery.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation or position as then described or as shown in the drawings under discussion. These relative terms are for convenience of description, and do not indicate or imply that the devices or elements referred to must have a particular orientation, or be constructed or operated in a particular orientation. Thus, these terms shall not be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communication; may also be direct connections or indirect connections via intervening structures; may also be inner communications or interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases throughout this specification are not necessarily referring to the same embodiment or example of the present disclosure. Furthermore, the particular features, structures, materials, or characteristics may be combined in any suitable manner in one or more embodiments or examples. Moreover, different embodiments or examples as well as features in different embodiments or examples can be incorporated and combined without contradiction.

Although embodiments have been shown and described, it would be appreciated by those skilled in the art that various changes, modifications, alternatives and variations can be made in the embodiments without departing from principles and purposes of the present disclosure. The scope of the present disclosure is defined by claims and the like.

What is claimed is:

1. An electrode sheet, the electrode sheet having a first end and a second end opposite to each other, and the electrode sheet comprising:
   a current collector comprising a side surface, a first surface and a second surface opposite to each other in a thickness direction of the current collector, and a first end portion and a second end portion opposite to each other in a length direction of the current collector, wherein the side surface is located between the first surface and the second surface, the first surface comprises a first coated zone and a first uncoated zone, and the second surface comprises a second coated zone;
   an active material disposed on the first coated zone and the second coated zone; and
   a plurality of electrode tabs, each electrode tab being coupled to the side surface and extending out of the side surface and at least two of the plurality of electrode tabs being located at the first coated zone,
   wherein the first coated zone is flush with the second coated zone at the first end, the first coated zone is misaligned with the second coated zone at the second end, and a sum of a length of the first coated zone and a length of the first uncoated zone is equal to a length of the second coated zone, and
   each of the first and second end portions of the current collector has a blank foil segment with no active material disposed on both sides of the blank foil segment and no electrode tab extending out of the side surface located in the blank foil segment of the each of the first and second end portions.

2. The electrode sheet according to claim 1, wherein the first uncoated zone is provided with at least one electrode tab.

3. A cell, comprising a separator, a cathode electrode sheet, and an anode electrode sheet, the cathode electrode sheet and the anode electrode sheet each being an electrode sheet having a first end and a second end opposite to each other, and the electrode sheet comprising:
   a current collector comprising a side surface, a first surface and a second surface opposite to each other in a thickness direction of the current collector, and a first end portion and a second end portion opposite to each other in a length direction of the current collector, wherein the side surface is located between the first surface and the second surface, the first surface comprises a first coated zone and a first uncoated zone, and the second surface comprises a second coated zone;
   an active material disposed on the first coated zone and the second coated zone; and
   a plurality of electrode tabs, each electrode tab being coupled to the side surface and extending out of the side surface and at least two of the plurality of electrode tabs being located at the first coated zone,
   wherein the first coated zone is flush with the second coated zone at the first end, the first coated zone is misaligned with the second coated zone at the second end, and a sum of a length of the first coated zone and a length of the first uncoated zone is equal to a length of the second coated zone, and
   each of the first and second end portions of the current collector has a blank foil segment with no active material disposed on both sides of the blank foil segment and no electrode tab extending out of the side surface located in the blank foil segment of the each of the first and second end portions.

4. The cell according to claim 3, wherein the first uncoated zone of the cathode electrode sheet is provided with at least one electrode tab and the first uncoated zone of the anode electrode sheet is provided with at least one electrode tab.

5. The cell according to claim 3, wherein the first coated zone is misaligned with the second coated zone at a tail end of the cathode electrode sheet.

6. The cell according to claim 5, wherein the first coated zone is misaligned with the second coated zone at a head end of the anode electrode sheet.

7. The cell according to claim 3, wherein the anode electrode sheet comprises a plurality of anode electrode tabs and the side surface, the anode electrode tabs protrude beyond the side surface, and the side surface is provided with an insulating member.

8. The cell according to claim 3, wherein the first coated zone is misaligned with the second coated zone at a tail end of the anode electrode sheet; the first coated zone is misaligned with the second coated zone at a head end of the cathode electrode sheet.

9. A battery, comprising a cell, an electrolyte, and a packaging case, the cell comprising a separator, a cathode electrode sheet, and an anode electrode sheet, the cathode electrode sheet and the anode electrode sheet each being an electrode sheet having a first end and a second end opposite to each other, and the electrode sheet comprising:
   a current collector comprising a side surface, a first surface and a second surface opposite to each other in a thickness direction of the current collector, and a first end portion and a second end portion opposite to each other in a length direction of the current collector, wherein the side surface is located between the first surface and the second surface, the first surface comprises a first coated zone and a first uncoated zone, and the second surface comprises a second coated zone;
   an active material disposed on the first coated zone and the second coated zone; and
   a plurality of electrode tabs, each electrode tab being coupled to the side surface and extending out of the side surface and at least two of the plurality of electrode tabs being located at the first coated zone,
   wherein the first coated zone is flush with the second coated zone at the first end, the first coated zone is misaligned with the second coated zone at the second end, and a sum of a length of the first coated zone and a length of the first uncoated zone is equal to a length of the second coated zone, and
   each of the first and second end portions of the current collector has a blank foil segment with no active material disposed on both sides of the blank foil segment and no electrode tab extending out of the side surface located in the blank foil segment of the each of the first and second end portions.

10. The battery according to claim 9, wherein the first coated zone is misaligned with the second coated zone at a tail end of the cathode electrode sheet.

11. The battery according to claim 10, wherein the first coated zone is misaligned with the second coated zone at a head end of the anode electrode sheet.

12. The battery according to claim 9, wherein the anode electrode sheet comprises a plurality of anode electrode tabs and the side surface, the anode electrode tabs protrude beyond the side surface, and the side surface is provided with an insulating member.

\* \* \* \* \*